United States Patent
Teglia et al.

(10) Patent No.: US 8,144,865 B2
(45) Date of Patent: Mar. 27, 2012

(54) PROTECTION OF THE EXECUTION OF A DES ALGORITHM

(75) Inventors: Yannick Teglia, Marseille (FR); Pierre-Yvan Liardet, Peynier (FR); Alain Pomet, Rousset (FR)

(73) Assignee: STMicroelectronics S.A., Montrouge (FR)

( * ) Notice: Subject to any disclaimer, the term of this patent is extended or adjusted under 35 U.S.C. 154(b) by 897 days.

(21) Appl. No.: 11/641,940

(22) Filed: Dec. 19, 2006
(Under 37 CFR 1.47)

(65) Prior Publication Data
US 2007/0263859 A1 Nov. 15, 2007

(30) Foreign Application Priority Data

Dec. 19, 2005 (FR) ..................................... 05 53931

(51) Int. Cl.
*H04K 1/00* (2006.01)
*G06F 1/00* (2006.01)
(52) U.S. Cl. .......................................... 380/29; 713/340
(58) Field of Classification Search .................... 380/29; 713/340
See application file for complete search history.

(56) References Cited

U.S. PATENT DOCUMENTS

| | | | | |
|---|---|---|---|---|
| 5,608,801 A * | 3/1997 | Aiello et al. | ..................... | 380/46 |
| 6,028,939 A * | 2/2000 | Yin | ................. | 713/189 |
| 6,278,783 B1 * | 8/2001 | Kocher et al. | .................. | 380/277 |
| 6,295,606 B1 * | 9/2001 | Messerges et al. | ............ | 713/189 |
| 7,159,115 B2 * | 1/2007 | Fujisaki et al. | ................ | 713/171 |
| 7,166,783 B2 | 1/2007 | Delzer | | |
| 7,206,408 B1 * | 4/2007 | Naccache | ......................... | 380/44 |
| 7,386,130 B2 * | 6/2008 | Ito et al. | ......................... | 380/263 |
| 7,397,916 B2 * | 7/2008 | Johnson et al. | .................. | 380/28 |
| 7,580,519 B1 * | 8/2009 | Goh | ................................. | 380/29 |
| 7,587,044 B2 * | 9/2009 | Kocher et al. | ...................... | 380/1 |
| 2001/0054163 A1 | 12/2001 | Teglia | | |
| 2002/0051534 A1 * | 5/2002 | Matchett et al. | ................. | 380/37 |
| 2002/0124178 A1 * | 9/2002 | Kocher et al. | .................. | 713/193 |
| 2003/0048903 A1 * | 3/2003 | Ito et al. | ......................... | 380/263 |
| 2003/0182566 A1 * | 9/2003 | Kohara et al. | .................. | 713/193 |
| 2004/0025032 A1 * | 2/2004 | Chow et al. | ..................... | 713/189 |
| 2004/0091107 A1 * | 5/2004 | Fujisaki et al. | .................. | 380/42 |
| 2004/0139340 A1 * | 7/2004 | Johnson et al. | ............... | 713/194 |
| 2004/0193898 A1 * | 9/2004 | Ochi et al. | ..................... | 713/189 |
| 2005/0028061 A1 | 2/2005 | Nicolaidis | | |
| 2005/0271202 A1 * | 12/2005 | Shu et al. | ......................... | 380/29 |
| 2005/0273630 A1 * | 12/2005 | Shu et al. | ....................... | 713/189 |

(Continued)

FOREIGN PATENT DOCUMENTS

DE 102 23 175 A1 12/2003

(Continued)

OTHER PUBLICATIONS

French Search Report from French Patent Application 05/53931, filed Dec. 19, 2005.

*Primary Examiner* — Techane Gergiso
(74) *Attorney, Agent, or Firm* — Wolf, Greenfield & Sacks, P.C.

(57) ABSTRACT

A method for protecting an execution, by an integrated circuit, of a ciphering and/or deciphering algorithm taking into account data and at least one valid key and performing several iterations of the same calculation, including at least one execution of an iteration with the valid key between several executions of the same iteration with the invalid keys obtained by applying at least one non-linear one-way function to the valid key.

14 Claims, 2 Drawing Sheets

U.S. PATENT DOCUMENTS

| | | | |
|---|---|---|---|
| 2005/0273631 A1* | 12/2005 | Shu et al. | 713/190 |
| 2006/0056622 A1* | 3/2006 | Liardet et al. | 380/28 |
| 2006/0177052 A1* | 8/2006 | Hubert | 380/29 |
| 2007/0076864 A1* | 4/2007 | Hwang | 380/29 |
| 2007/0180541 A1* | 8/2007 | Shu et al. | 726/34 |
| 2007/0288768 A1* | 12/2007 | Nesta et al. | 713/194 |

FOREIGN PATENT DOCUMENTS

| | | |
|---|---|---|
| EP | 1 052 801 A2 | 11/2000 |
| EP | 1 263 163 A1 | 12/2002 |

* cited by examiner

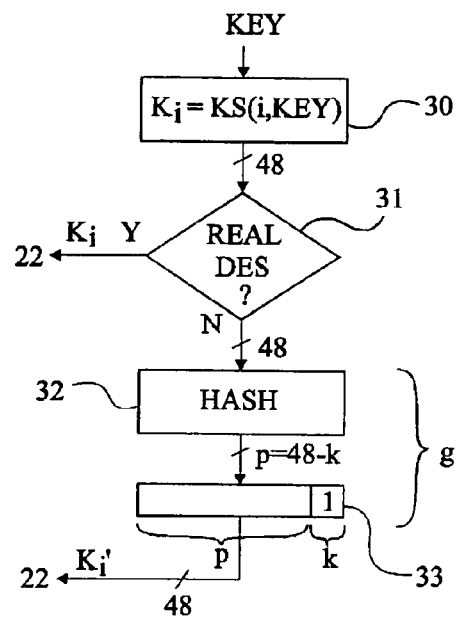
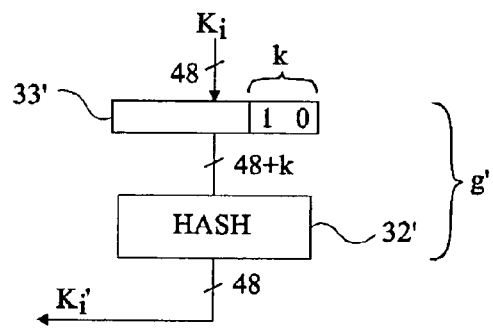
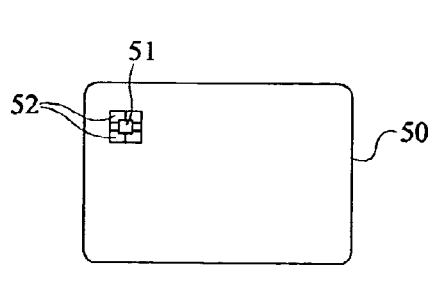
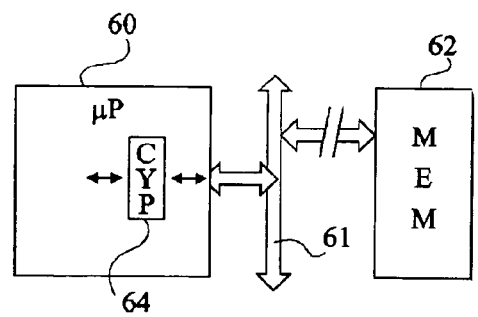
Fig 2
Fig 3
Fig 5
Fig 6

PROTECTION OF THE EXECUTION OF A DES ALGORITHM

BACKGROUND OF THE INVENTION

1. Field of the Invention

The present invention relates to ciphering algorithms, especially of Data Encryption Standard (DES) type, executed by integrated circuits. The present invention more specifically relates to the protection of the execution of a DES algorithm against an attack by differential power analysis (DPA) of the circuit which executes the algorithm.

2. Discussion of the Related Art

DES or triple DES algorithms are symmetrical ciphering algorithms (with a secret key) used in cryptography, for example, to cipher data before transmission over unprotected supports (Internet, connection between a smart card and a card reader, between a processor and an external memory, etc.). Such algorithms are described, for example, in standards FIPS PUB 46-2 (DES) and FIPS PUB 46-1, and operating modes (known as electronic codebook—ECB, cipher block chaining—CBC, cipher feedback—CFB, output feedback—OFB) are described in FIPS PUB 81.

Such algorithms perform a ciphering by blocks (of 64 bits) by using keys (of 64 bits for the DES and of 128 for the triple DES) from which are derived 48-bit sub-keys. The deciphering is performed from the same key (symmetrical algorithm). In the following description, the DES algorithm will be taken as an example.

FIG. 1 is a schematic block diagram illustrating the successive steps of a DES algorithm to which the present invention more specifically applies.

A block of data to be ciphered (noted M) is submitted to an initial permutation IP (block 11), then to 16 iterations of a calculation depending on a key, noted KEY, and finally to a permutation inverse to the initial permutation, noted $IP^{-1}$ (block 12).

The calculation depending on key KEY may be expressed with the following notations:

i, the rank of the iteration ranging between 1 and 16 (initialization of i, block 13, i=1);

$K_i$, a 48-bit block extracted from 64-bit key KEY (DES example) used in the ciphering function of rank i;

$L_i R_i$, a 64-bit data block, resulting from the application of a function f to a block $R_{i-1}$ (block 14) with sub-key $K_i$, formed of a left-hand 32-bit word or sub-block $L_i$ and of a right-hand 32-bit word or sub-block $R_i$; and f, a ciphering function.

With the above notations, the result of initial permutation 11 is a block $L_0 R_0$ and each iteration or turn from 1 to 16 applies:

$L_i$ (block 16)=$R_{i-1}$ (block 14); and $R_i$ (block 17)=$L_{i-1}$(+)f($R_{i-1}$, $K_i$), where (+) designates a bit-to-bit addition modulo 2 (block 18), that is, a bit-to-bit XOR, combining result f($R_{i-1}$, $K_i$) with word $L_{i-1}$ (block 19).

As long as the last turn has not been reached (output N of block 15, i=16 ?), index i is incremented (block 20, i=i+1) and the next iteration is applied. The result of the last iteration is a block $L_{16}R_{16}$ (output Y of block 15) which, after having been turned (block 25) into block $R_{16}L_{16}$, is submitted to the inverse permutation $IP^{-1}$ 12 to provide a ciphered block designated as M'.

Function f comprises three successive steps:

a first step is an expansion, noted E (block 21) of the 32 bits of sub-block $R_{i-1}$ into 48 bits to combine them, by a bit-to-bit XOR function 22 (+), with the 48 bits of sub-key $K_i$ of the concerned iteration. This expansion and combination provides 8 six-bit groups;

a second step applies to the 48 bits resulting from the preceding step a substitution table, noted S (block 23) or SBOX. In this step, each six-bit group resulting from the previous expansion is transformed, by one of eight substitution functions (primitive functions) to obtain eight four-bit groups, that is, 32 bits again;

a third step is a permutation, designated as P (block 24), of the 32 bits resulting from the previous step. This permutation provides a 32-bit result sub-block corresponding to the result of function f.

Each sub-key $K_i$ is obtained (block 30) by applying a primitive key function KS to key KEY, function KS depending on rank i of the iteration, that is: $K_i$=KS(i, KEY).

The details of primitive functions KS, S, and P, as well as of function E, are described in the above-mentioned standards.

The deciphering is performed by submitting a block to be deciphered M' to permutation IP, then to calculation iterations identical to those of the ciphering, with the sole difference that the sub-keys are used in an inverse order (it is started from sub-key $K_{16}$ to end with sub-key $K_1$). The first block resulting from permutation IP is block $L_{16}R_{16}$ and the block resulting from the last iteration to be submitted to permutation $IP^{-1}$ is block $R_0 L_0$. Permutation $IP^{-1}$ provides deciphered block M.

A weakness of DES-type algorithms appears in attacks by differential power analysis of a circuit executing the algorithm. Such attacks consist of making assumptions about the key to correlate an intermediary result with the integrated circuit power consumption. Such attacks enable discovering the secret key. Indeed, function f is known (DES standard), and so are the input data M (or M') applied to the algorithm. When making an assumption on a portion of sub-key K, part of the bits of an intermediary result $L_i R_i$ is obtained. If a correlation between this part of the bits and the circuit power consumption is obtained at a given time, the assumption about the key is verified. Computation means enable hackers to make assumptions in a sufficient number, and thus to hack the secret of the circuit (the key).

The key is generally stored in a secure circuit area, for example, in an integrated circuit customization phase. Its loading into the algorithm execution cell is performed in protected fashion, for example, by applying the methods described in U.S. published patents application 2001/0054163 and U.S. Pat. No. 7,166,783.

A first known solution, to attempt protecting a secret handled by a DES algorithm, is to mask the execution by introducing random numbers into the iterations. This solution has the disadvantage of requiring a modification of the actual algorithm.

A second known solution is to mask the algorithm execution with the secret key by having it execute among several executions (on the order of some ten) using dummy keys. These keys are permanently stored in a non-volatile memory associated with the algorithm execution processor or directly hardwired in the circuit. The real key is generally written on customization of the circuit (for example, of the smart card) by a person different from the circuit manufacturer, in a generally inaccessible area (secure circuit area). Thus, a hacker cannot know, when an assumption about the key is verified, whether the right key or not has been used. A disadvantage of this solution is that, to preserve the masking, it is necessary to protect all keys (the fake ones as well as the right ones) on loading thereof into the algorithm execution cell. This takes time and lengthens, in a way incompatible with the desired fast data handling, the execution of this algorithm. Another disadvantage of this solution is that it introduces white noise only, thus easily filterable by the pirate.

SUMMARY OF THE INVENTION

The present invention aims at improving the security of ciphering algorithms, in particular of DES type, against attacks by differential power analysis of an integrated circuit which executes this algorithm.

The present invention especially aims at providing a solution compatible with the rapidity desired for the data ciphering and deciphering operations.

The present invention also aims at providing a solution which does not require modifying the actual algorithm and which is thus compatible with conventional cells of execution of the DES algorithm.

The present invention also aims at avoiding having to pre-store dummy keys.

To achieve all or part of these objects, as well as others, the present invention provides a method for protecting an execution, by an integrated circuit, of a ciphering and/or deciphering algorithm taking into account data and at least one valid key and performing several iterations of a same calculation, comprising at least one execution of an iteration with the valid key between several executions of the same iteration with the invalid keys obtained by applying at least one non-linear one-way function to said valid key.

According to an embodiment of the present invention, said function is a hash function followed or preceded by an expansion function.

According to an embodiment of the present invention, the position of the execution with the valid key among the plurality of executions is randomly selected.

According to an embodiment of the present invention, the algorithm is the DES, the invalid keys being sub-keys used exclusively for the first and last iterations.

The present invention also provides a processor of execution of a ciphering algorithm comprising a temporary register at least of same size as a register of storage of intermediary results of the algorithm for containing the intermediary results of the iteration with the valid key during the iterations with the invalid keys.

The present invention also provides a smart card.

The foregoing and other objects, features, and advantages of the present invention will be discussed in detail in the following non-limiting description of specific embodiments in connection with the accompanying drawings.

BRIEF DESCRIPTION OF THE DRAWINGS

FIG. 2 is a schematic block diagram illustrating an example of implementation of the protection method according to the present invention;

FIG. 3 partially illustrates a variation of the method of FIG. 2;

FIG. 5 very schematically shows a smart card to which the present invention for example applies; and FIG. 6 partially and schematically shows another example of application of the present invention.

DETAILED DESCRIPTION

Figure 1:
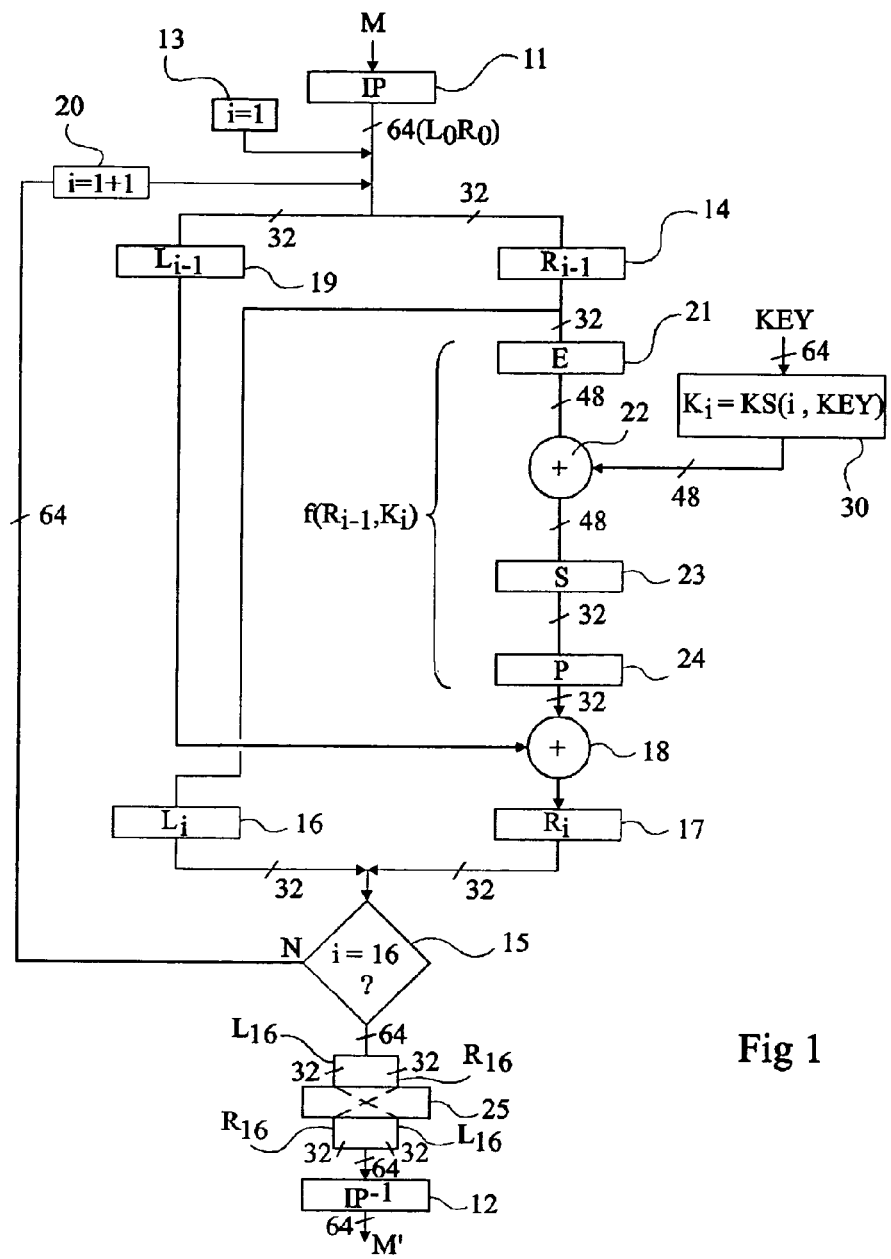
FIG. 1, previously described, is a schematic block diagram illustrating a conventional example of execution of a DES algorithm to which the present invention applies.

The same elements have been designated with the same reference numerals in the different drawings. For clarity, only those steps and elements which are useful to the understanding of the present invention have been shown in the drawings and will be described hereafter. In particular, the structural details of an integrated circuit likely to execute a DES algorithm or the like have not been described in detail, the present invention being compatible with hardware cells conventionally executing DES-type algorithms.

A feature of an aspect of the present invention is to mask the execution of the ciphering algorithm by executing this algorithm several times with dummy keys, thus masking the ciphering with the real key. Another feature of this aspect of the present invention is that the dummy keys are not obtained by predetermined masks, but by applying a non-linear one-way function to the real key or sub-key. Thus, a single key must be stored in secure fashion in the integrated circuit.

Preferably, especially in the case of the DES, fake executions are limited to the first and last iterations of the algorithm which are the iterations considered as most vulnerable to differential power analysis attacks (DPA).

FIG. 2 illustrates, in a simplified flowchart, an embodiment of the protection method according to the present invention. The present invention only affects the sub-key generation (introduction of combination 22 in FIG. 1), without modifying the rest of the execution of the DES algorithm and is thus compatible with conventional cells.

According to the embodiment of FIG. 2, on each generation of a sub-key $K_i$ by conventional function KS (block 30), the program decides (for example, randomly) whether the current execution concerns a fake execution or the real one (test 31, REAL DES ?). If it is real (output Y of block 31), key $K_i$ generated by block 30 is provided to the input of adder 22 to be combined with the result of expansion 21 (FIG. 1). If not (output N of test 31), a one-way function is applied to the generated key $K_i$. This function, noted g in FIG. 2, is selected to be a one-way function, that is, where, knowing the actual function and the result that it provides, it is not possible to retrace the input data (sub-key $K_i$). It further is a non-linear function, that is, where a combination of the application of the function to two operands (for example, g(A)+g(B)) provides a different result than the application of the function to the combination of the two operands (g(A+B)).

According to a preferred example of embodiment, function g implements a hash function (block 32, HASH), for example, of type ND5, SHA-1, RIPEMD160, etc. The result of this hash function is a number p of bits smaller than number 48 of bits of sub-key $K_i$. This result is thus completed by a number k of bits in a predetermined state (for example, 1), as illustrated by block 33 in FIG. 2. The result of block 33 provides a dummy key $K_i'$ sent to adder 22.

FIG. 3 partially illustrates a variation of function g in which hash function 32' is applied after expansion of sub-key $K_i$ by addition of k bits in a predetermined state (block 33'). Result $K_i'$ is then provided by the hash function which brings the number of bits down to 48.

The implementation of function g or g' of the present invention is performed, preferably, only at the first and last iterations of the DES algorithm. The number of "fake" executions, preferably ranging between 2 and a few tens, depends on the available time and is thus linked to the application. This number may be variable from one execution to the other of the DES algorithm.

Once the first iteration has been passed (once all the fake sub-keys and the real one have been played for the first iteration), the execution of the DES algorithm is carried on with the intermediary result $L_1 R_1$ obtained with the real first sub-key.

Figure 4:
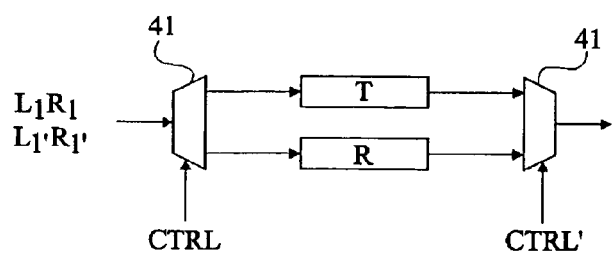
FIG. 4 partially and functionally shows an example of use of a register of an integrated circuit for the implementation of the present invention.

FIG. 4 shows an example of a functional circuit usable for the implementation of the present invention. It is assumed that intermediary results $L_iR_i$ of the normal execution are stored in a register R. An additional register T of same size is then provided to store these intermediary results when a dummy key is handled. The selection between register T and register R is performed by a selector 41 controlled by a signal CTRL depending on the result of test 31. Similarly, a selector 41' controlled by a signal CTRL' enables reading either register R or register T. Signals CTRL and CTRL' are, for example, provided by the central processing unit of the circuit. The selections in write and read mode of the registers may also be performed by software means.

Before execution of a first iteration (real or fake), the intermediary results contained in register R are copied into register T. In the case where test 31 (FIG. 2) results in using the real first turn key $K_1$, the result $L_1R_1$ obtained at the end of this "real" iteration are then stored in temporary register T. Then, the content of register T is copied into register R.

In the case where test 31 results in the use of a fake first turn key $K_1'$, result $L_1'R_1'$ of this first turn is stored in register R. At each end of each fake iteration, the content of register T is copied into register R to, if it is the last fake execution, find back the right path of the DES algorithm.

Preferably, between each fake execution, the content of register R is also previously assigned to that of register T (register R always contains the right result at the end of a turn) to avoid making the execution with the real sub-key detectable.

Once all fake sub-keys and the real one have been played, the execution carries on with the second iteration of the DES, preferably with no masking, recovering the content of register R, which is $L_1R_1$.

The same operation is repeated, preferably, for the last iteration of the DES (keys $K_{16}$ and $K_{16}'$).

In an application of the present invention to other symmetrical algorithms, the dummy keys are, preferably, played on the iterations considered as most vulnerable in terms of security.

An advantage of the present invention is that the correlations are created on fake sub-keys and limit the information about the real key.

Another advantage of the present invention is that knowing function g of determination of the dummy keys does not enable finding key $K_i$ from key $K_i'$. Preferably, it will however be tried to maintain function g secret.

Another advantage of the present invention is that it requires no modification of the DES algorithm execution cell, only a handling of registers being required.

Another advantage of the present invention is that the introduction of a white noise is avoided, which makes detections by a possible hacker more difficult.

FIG. 5 schematically shows a smart card 50 of the type to which the present invention for example applies. Such a smart card is most often formed of a plastic support on or inside of which is placed an integrated circuit chip 51 associated with contacts 52 of communication with a terminal and/or with elements (not shown) of radio frequency transmission/reception for a contactless communication. Integrated circuit 51 comprises a ciphering and deciphering function (for example, of DES or triple DES type) for ciphering exchanges with a reader (not shown). At least one sub-key provided to this function is processed by the method of the present invention.

FIG. 6 is a schematic block diagram illustrating another example of application of the present invention. A microprocessor (60) communicates over a connection—for example, a bus 61 or any other connection possibly using several supports (wireless connection, Internet, etc.)—with a storage element (for example, a memory 62) for storing in it data ciphered by an algorithm. The microprocessor comprises for this purpose a ciphering (software and/or hardware) and deciphering function (block 64, CYP) for processing all or part of the data to be stored. At least one sub-key provided to function 64 is processed by the method of the present invention.

More generally, the present invention applies to any circuit using a ciphering algorithm.

Of course, the present invention is likely to have various alterations, improvements, and modifications which will readily occur to those skilled in the art. In particular, the practical implementation of the present invention, be it with hardware or software means, is within the abilities of those skilled in the art based on the functional indications given hereabove. Preferably, function g is executed in hardware fashion, which makes it more efficient.

Moreover, the hash function to be used to generate the dummy keys may be selected according to the functions generally available in the integrated circuit to be protected.

Further, although the present invention has been described in relation with a preferred masking of the first and last iterations of the DES algorithm, it may be decided to implement the dummy keys at other iterations and in other symmetrical algorithms. Finally, the same type of protection may be implemented on the deciphering side since the secret key is also used.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method comprising:
protecting an execution, by an integrated circuit, of an encryption algorithm taking into account data and at least one valid key and performing several iterations of a same calculation; and
performing at least one execution of an iteration with the valid key and performing several executions of the same iteration with invalid keys obtained by applying at least one non-linear one-way function to said valid key.

2. The method of claim 1, wherein said function is a hash function followed or preceded by an expansion function.

3. The method of claim 1, wherein a position of the execution with the valid key among the plurality of executions is randomly selected.

4. The method of claim 1, wherein the algorithm is a Data Encryption Standard Algorithm, the invalid keys being sub-keys used exclusively for the first and last iterations.

5. A processor for execution of an encryption algorithm for implementing the method of claim 1, comprising:
a temporary register at least of same size as a register of storage of intermediary results of the algorithm for containing the intermediary results of the iteration with the valid key during the iterations with the invalid keys.

6. A smart card comprising an integrated circuit configured to implement the method of claim 1.

7. A method for protecting execution, by an integrated circuit, of an encryption algorithm that requires several iterations of a calculation based on data and on a valid key, the method comprising:
selecting, by the integrated circuit, a valid execution or an invalid execution of an iteration of the calculation;

if the invalid execution is selected, applying, by the integrated circuit, to the valid key a non- linear, one-way function to provide an invalid key;

performing, by the integrated circuit, two or more executions of the iteration using the invalid key; and if the valid execution is selected, performing, by the integrated circuit, an execution of the iteration with the valid key.

8. The method of claim 7, wherein applying a non-linear, one-way function comprises applying a hash function and an expansion function.

9. The method of claim 7, wherein selecting includes selecting an invalid execution for a first iteration of the calculation.

10. The method of claim 7, wherein selecting includes selecting an invalid execution for a last iteration of the calculation.

11. The method of claim 7, wherein selecting includes randomly selecting a valid execution or an invalid execution.

12. The method of claim 7, further comprising storing intermediary results of the valid execution in a normal register and storing intermediary results of the invalid execution in a temporary register.

13. A smart card comprising:

a plastic support and an integrated circuit configured to perform a method for protecting execution, by the integrated circuit, of an encryption algorithm that requires several iterations of a calculation based on data and on a valid key, the method comprising:

selecting, by the integrated circuit, a valid execution or an invalid execution of an iteration of the calculation;

if the invalid execution is selected, applying, by the integrated circuit, to the valid key a non-linear, one-way function to provide an invalid key;

performing, by the integrated circuit, two or more executions of the iteration using the invalid key; and if the valid execution is selected, performing, by the integrated circuit, an execution of the iteration with the valid key.

14. A computing device comprising: a processor and a storage device encoded with instructions that, when executed by the processor, perform a method for protecting execution, by the processor, of an encryption algorithm that requires several iterations of a calculation based on data and on a valid key, the method comprising:

selecting, by the processor, a valid execution or invalid execution of an iteration of the calculation;

if the invalid execution is selected, applying, by the processor, to the valid key a non\- linear, one-way function to provide an invalid key;

performing, by the processor, two or more executions of the iteration using the invalid key; and if the valid execution is selected, performing, by the processor, an execution of the iteration with the valid key.

* * * * *